United States Patent [19]

Grutter et al.

[11] Patent Number: 5,547,435
[45] Date of Patent: Aug. 20, 1996

[54] AUTOMATIC TRANSMISSION GEAR SHIFT CONTROL DURING POWER REDUCTION

[75] Inventors: Peter J. Grutter, Plymouth; Matthew J. Gerhart, Dearborn Heights; Matthew J. Gladd, Dearborn; John A. Cushing, Woodhaven, all of Mich.

[73] Assignee: Ford Motor Company, Dearborn, Mich.

[21] Appl. No.: 340,916

[22] Filed: Nov. 17, 1994

[51] Int. Cl.⁶ ............................................. B60K 41/10
[52] U.S. Cl. .................................................. 477/110
[58] Field of Search ............................ 477/107, 110; 180/197

[56] References Cited

U.S. PATENT DOCUMENTS

| | | | |
|---|---|---|---|
| 5,086,670 | 2/1992 | Nitz et al. | 477/154 |
| 5,191,953 | 3/1993 | Ito et al. | 477/110 |
| 5,377,562 | 1/1995 | Kitagawa et al. | 477/110 |
| 5,403,247 | 4/1995 | Yagi | 477/110 |
| 5,405,302 | 4/1995 | Yagi et al. | 477/110 |

*Primary Examiner*—Dirk Wright
*Attorney, Agent, or Firm*—Frank G. McKenzie; Roger L. May

[57] ABSTRACT

A method and system for controlling gear ratio changes of a transmission operating in a powertrain with an internal combustion engine controlled by an engine throttle and having a device, such as traction assist system, that alters engine torque from that corresponding to the position of the throttle. The control substitutes a synthetic throttle position for actual throttle position during a traction assist event. Gearshifts occur with reference to a schedule relating the desired gear, vehicle speed, and synthetic throttle position.

10 Claims, 2 Drawing Sheets

AUTOMATIC TRANSMISSION GEAR SHIFT CONTROL DURING POWER REDUCTION

BACKGROUND OF THE INVENTION

1. Field of the Invention

This invention relates to the field of automatic transmission control, particularly to electronic automatic transmission control.

2. Description of the Prior Art

It is conventional practice in automatic transmission control that scheduled gear ratio changes, both upshifts and downshifts, occur automatically on the basis of current vehicle speed and engine throttle position. When throttle position is large, gear shifts occur at higher vehicle speeds, and therefore at higher engine rpm.

Engine spark advance, air-fuel ratio, and other operating parameters are controlled electronically so that engine power meets the expectations of the vehicle operator, represented by commands produced by an on-board computer in response to driver input and external variables.

Certain devices for controlling vehicle subsystems intentionally alter the magnitude of engine torque and engine power from those corresponding to the engine throttle position in order to accomplish the function of those devices. For example, a traction assist system, which modifies operation of an antilock brake system to selectively hold and release the drive wheels of a vehicle to overcome problems associated with wheel slippage, intentionally reduces engine torque for a period in order to reduce or eliminate wheel slippage, although the vehicle operator, concurrently with the engine torque reduction, may demand higher torque than that permitted by the traction assist device by depressing the engine throttle pedal.

A potential conflict results because automatic transmission gear ratio changes occur on the basis of actual throttle position, represented by the extent to which the throttle pedal is depressed, yet the traction assist device reduces engine torque to a lower magnitude than that corresponding to the actual throttle position.

Accordingly, in a vehicle accelerating from a standing start on an icy surface, or another surface where wheel slippage occurs, the traction assist system decreases engine torque by producing signals that modify engine operation such as by altering engine spark timing, air-fuel ratio, or other engine parameters. Under these circumstances, the vehicle accelerates slowly due to the low surface friction, but driver demand, as measured by throttle position, may cause shifts to occur at high engine rpm. This condition produces high engine noise and relatively harsh gear ratio changes.

SUMMARY OF THE INVENTION

To avoid these problems in a powertrain having a device that intentionally reduces engine output power from that corresponding to the engine throttle position, such as a system for assisting traction contact of the drive wheels on the road surface or a system for cooling engine exhaust system catalysts, it is preferable to artificially create a substitute engine throttle position sensor input to the computer during periods when the meaning of the throttle position sensor is corrupted by traction assist or catalyst cooling system operation. This substitute throttle position is referred to as synthetic throttle position.

In a powertrain including a multiple gear automatic transmission, an engine controlled by a variable-position throttle and a part-time device enabled to alter the magnitude of power produced by the engine from that corresponding to the throttle position, a control method according to the present invention includes the steps of defining a first function relating the operating condition of the powertrain, represented by throttle position and vehicle speed, to a corresponding desired gear, defining a second function relating engine speed and net engine torque to a corresponding synthetic throttle position, determining net engine torque, vehicle speed, engine speed, and throttle position, and determining synthetic throttle position from the second function. Then, while the device is enabled, substituting synthetic throttle position for throttle position and determining the desired gear from the first function, and controlling the transmission to produce said desired gear, so determined. Either net torque or indicated torque may be used, the preferred term being dependent on the details of the specific implementation. For the purposes of this discussion, we will use net engine torque.

A system, according to this invention for controlling an automatic transmission that operates in multiple gears, includes an engine controlled by a variable-position throttle. A traction assist device, which is enabled part-time to alter the magnitude of power produced by the engine from that corresponding to the throttle position, receives signals representing the speed of the vehicle wheels, determines the occurrence of wheel slippage, and produces a command signal to alter the magnitude of power produced by the engine from that corresponding to the throttle position. Sensors repetitively produce signals representing current vehicle speed, current engine speed, and current throttle position. An electronic memory contains control algorithms, a first function relating a range of operating conditions of the powertrain defined by throttle position and vehicle speed to corresponding desired gears, and a second function relating engine speed and net engine torque to corresponding synthetic throttle positions. An electronic microprocessor is adapted to receive as input the sensor signals, to process information derived from said signals, to execute control algorithms, to determine current net engine torque, and to produce a command signal representing the desired gear produced by the transmission.

DESCRIPTION OF THE PREFERRED EMBODIMENT

Figure 1:
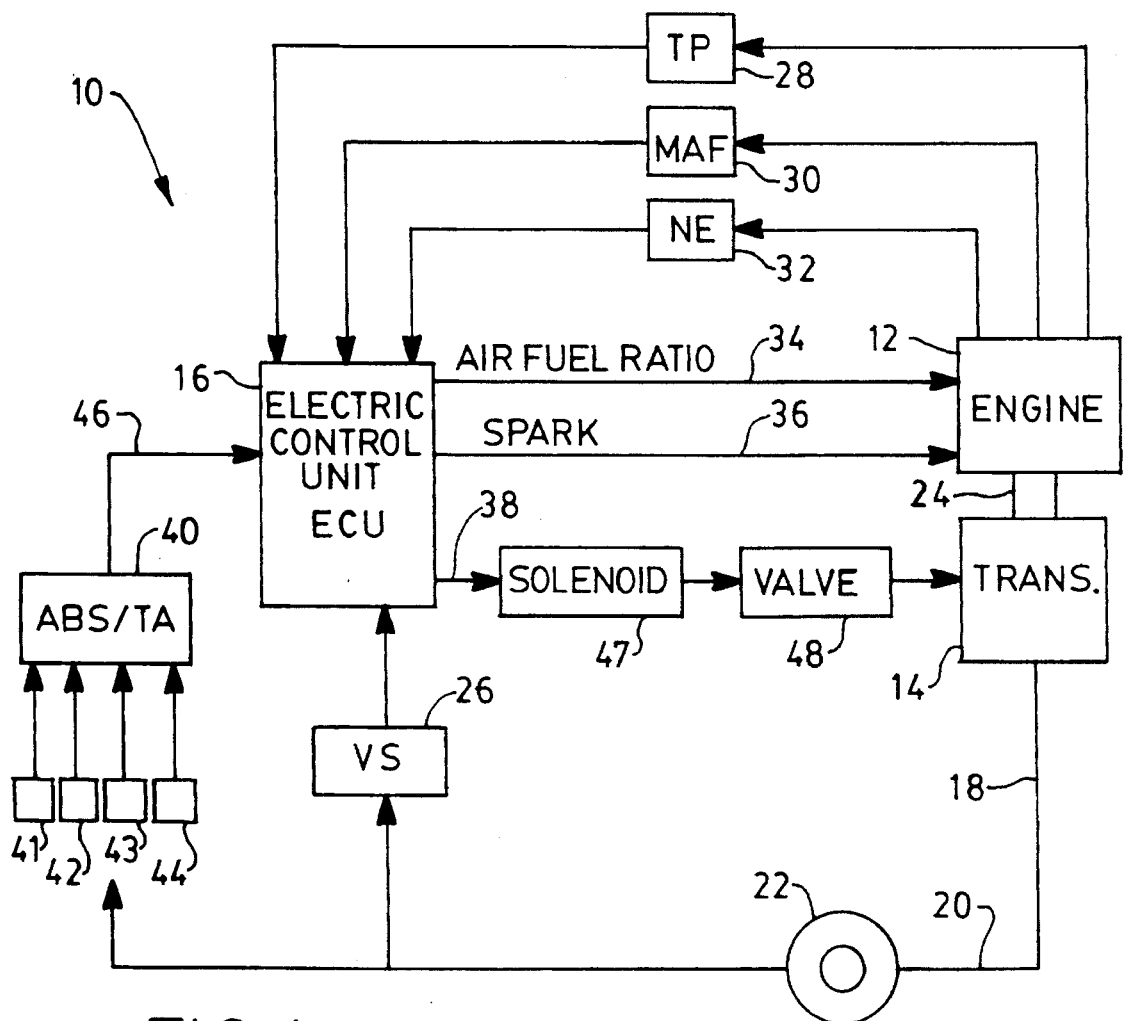
FIG. 1 is a schematic block diagram showing a computer based system for electronically implementing the invention.

Referring first to FIG. 1, there is shown a block diagram of a system 10 for use with the present invention. As illustrated, the system includes an internal combustion engine 12, transmission 14, and electronic control unit (ECU) 60. The transmission 14 transmits power produced by the engine through a driveshaft 18 and axle 20 to the drive wheels 22. Torque from the engine is transmitted through the engine output shaft 24 through a torque converter and multiple gear units located within the transmission. Various clutches and brakes are actuated hydraulically in response to control signals emanating from the ECU 16, which signals control operation of solenoid-operated hydraulic valves that selectively open and close a source of hydraulic pressure to the clutches and brakes actuated by the pressure source. As these friction elements are selectively engaged and disengaged, the various gear ratios of the transmission are produced.

It should be appreciated that the ECU 16 includes a microprocessor and electronic memory, such as RAM and ROM memories, not specifically illustrated for the sake of clarity. It should be understood that in the preferred embodiment the control unit 16 is a powertrain control module, which cooperates with other control units for performing transmission control and engine control.

In the preferred embodiment, the ECU 16 executes a control strategy based on a plurality of operating parameters such as engine throttle position (TP), mass airflow rate (MAF), engine speed (NE), vehicle speed (VS), gear shift lever position (PRNDL), to name a few. Sensors, such as vehicle speed sensor 26, throttle position sensor 28, MAF sensor 30, engine speed sensor 32, provide information to the ECU 16. The ECU uses these vehicle operating parameters to produce control signals carried on lines 34, 36, respectively, which control the air-fuel ratio of the change entering the engine and engine spark timing, and to produce control commands to the transmission carried on lines 38 to change the operating gear of the transmission 14. Various shift solenoids 47, energized and deenergized in response to the shift command signals, open and close valves 48, which open and close a source of pressurized fluid to friction clutches and brake that produce the desired gear.

A traction assist control module 40 receives electric input signals produced by wheel speed sensors 41–44 representing the rotational speed of the vehicle wheels. The module produces electronic signals used to initiate application and release of the wheel brakes. Module 40 also produces, as output, a signal, carried on line 46 to an ECU 16 input terminal, representing a desired magnitude of engine torque or power. The ECU processes that signal and modifies either the air-fuel ratio, engine spark timing, or other operating parameters of the engine, so that the power produced by the engine conforms to the desired value represented by the signal produced by the traction assist module 40. Instead of modifying the air-fuel ratio or spark timing, engine power can be reduced in response to the output of module 40 by reducing airflow into the engine, using an electronically controlled throttle plate arranged in series with the conventional throttle plate controlled manually by the vehicle operator. The electronically controlled throttle responds to output of module 40 to restrict engine inlet airflow from that corresponding to the position of the manually controlled throttle. Alternatively, airflow can be reduced through use of a stretcher device fitted on the cable that transmits movement of the throttle pedal to the engine inlet. A stretcher of this kind, when operative, conveys only a portion of the pedal motion to the engine throttle plate.

Figure 4:
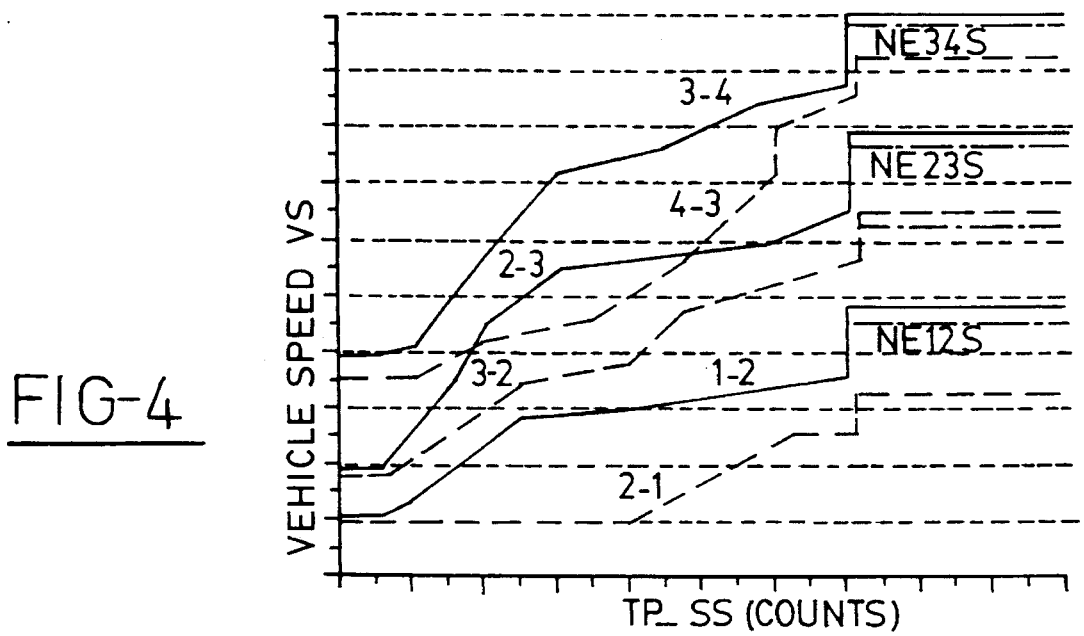
FIG. 4 is a diagram showing the relationship among vehicle speed, throttle position, and engine speed for various functions representing gear ratio changes of an electronic controlled automatic transmission.

The memory, which is accessible by the ECU, contains a function, represented graphically in FIG. 4, showing the relationship among throttle position TP_SS, the angular displacement of the engine throttle from a reference position, vehicle speed VS, and zones of the function bounded by upshift and downshift lines showing a desired upshift and downshift among the gear ratios produced by the transmission. Vehicle speed and throttle position and current operating gear are continually monitored to determine whether the current operating gear is the desired gear, as defined by the function. For example, if the transmission is currently operating in the first gear ratio, and the operating condition of the powertrain represented by vehicle speed and throttle position crosses the 1–2 line of FIG. 4, an upshift is commanded to the second gear ratio on line 38. This command causes the clutches and brakes of the transmission to apply and release, as required, so that the second gear ratio is produced. At the right-hand extremity of throttle position, upshifts and downshifts occur with reference to engine speed and throttle position rather than with respect to throttle position and vehicle speed.

Figure 2:
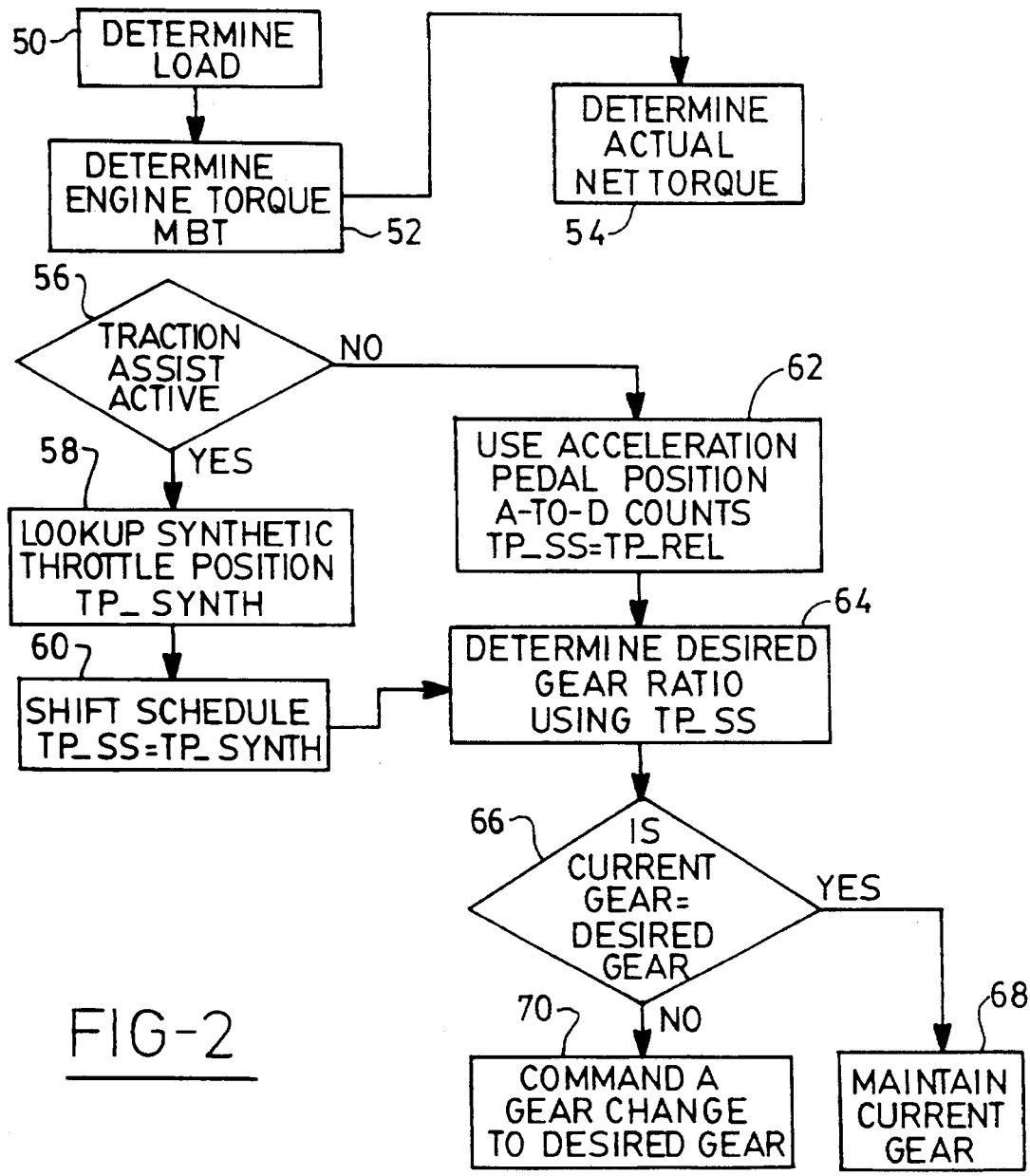
FIG. 2 is a logic flow diagram outlining the control of the present invention.
Figure 3:
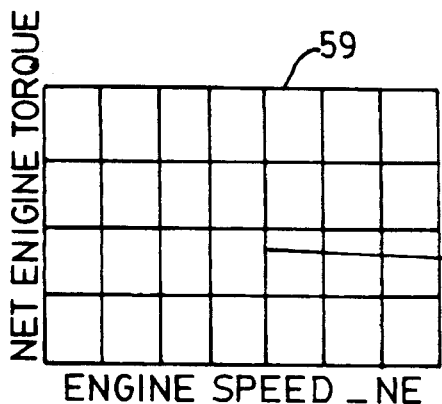
FIG. 3 is a schematic representation of an engine mapping function relating net engine torque and engine speed to synthetic throttle position.

Referring now to FIG. 2, there is shown a logic flow chart detailing control of the powertrain, including gear ratio changes of the transmission, according to the present invention. A control algorithm, substantially corresponding to the logic of FIG. 2, is stored in memory and executed repeatedly in the ECU.

At statement 50, engine load is determined, preferably by dividing cylinder air charge, which is the airflow rate divided by engine speed, by the air charge under standard conditions of temperature and pressure. However engine load is determined or calculated, the result is similar or proportional to that obtained by reading engine intake manifold pressure.

Figure 5:
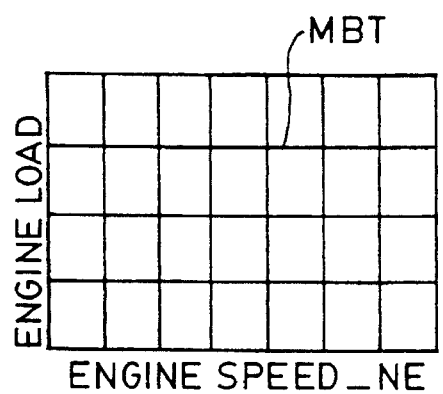
FIG. 5 is a schematic diagram representing a function relating engine speed, engine load, and engine brake torque.

At statement 52, mean engine brake torque (MBT) is determined from mapping engine data stored in memory in the form of a function relating MBT, current engine speed, and the current engine load. FIG. 5 illustrates graphically the function from which MBT is determined having current engine load, determined by executing statement 50, and current engine speed NE, read repetitively.

At statement 54, the net torque of the engine is determined by correcting for engine dynamic variables due to the effect of the traction assist device, preferably by a calculation employing air-fuel ratio, engine brake torque, current spark advance with reference to an optimal spark position, and the number of injectors, minus losses, particularly frictional losses.

Generally, the control logic determines, at statement 56, whether traction assist device 40 is active. If so, control passes to statement 58 where synthetic throttle position TP_SYNTH is determined from a function stored in electronic memory accessible having current engine speed and net engine torque determined as a result of executing statement 54. Synthetic throttle is determined by mapping these three engine parameters so that the synthetic throttle position corresponds to current engine speed and a rolling average of net engine torque, which avoids transient effects by smoothing data through a low pass digital filter.

At statement 60, the variable throttle position TP_SS is set equal to synthetic throttle TP_SYNTH.

If statement 56 is false, indicating that traction assist is inactive, control is directed to statement 62, where an analog signal representing the position of the accelerator pedal is converted to a digital count TP_REL representing displacement from a reference position. The variable TP_SS is then set equal to TP_REL, the digital count of the accelerator pedal position relative to a reference position.

Thereafter, control passes to statement 64, where the function stored in memory, graphically illustrated in FIG. 4, is used to determine, from TP_SS and vehicle speed, the desired gear.

A comparison is made at statement 66 to determine whether the current gear is equal to the desired gear. If statement 66 is true, the transmission makes no gear ratio change and maintains the current gear. If, however, statement 66 is false, control passes to statement 70, where a gear change to the desired gear is commanded.

The transmission responds to the commanded gear ratio change by altering the engaged and disengaged state of the clutches and brakes of the transmission so that the appropriate components of a planetary gearset are held and released, thereby producing the desired gear ratio.

The control strategy of this invention substitutes an equivalent throttle or synthetic throttle position for the measured throttle position during a traction assist event, i.e., while the traction assist system is active.

The equivalent, or synthetic, throttle position is the throttle position that would produce the magnitude of engine torque actually being produced during a traction assist event while engine parameters are altered by the traction assist system. This invention permits use of a predetermined gearshift schedule, the function shown graphically in FIG. 4, and requires no additional calibration.

It is understood that while the form of the invention shown herein and described constitutes the preferred embodiment of the invention, it is not intended to illustrate all possible forms thereof. It will also be understood that words used are words of description rather than a limitation, and that various changes may be made without departing from the spirit and scope of the invention as disclosed.

We claim:

1. In a powertrain including a multiple gear automatic transmission, an engine controlled by a variable-position throttle and a device enabled part-time to alter the magnitude of power produced by the engine from that corresponding to the throttle position, a method comprising the steps of:

defining a first function relating the operating condition of the powertrain, partially represented by throttle position, to a corresponding desired gear;

defining a second function relating engine speed and net engine torque to a corresponding synthetic throttle position;

determining net engine torque, vehicle speed, engine speed, and throttle position;

determining synthetic throttle position from the second function;

while the device is enabled, substituting synthetic throttle position for throttle position and determining the desired gear from the first function; and controlling the transmission to produce said desired gear, so determined.

2. The method of claim 1, wherein the step of controlling the transmission further comprises:

comparing the current gear to the desired gear;

maintaining the current state of the transmission in the current gear, if said comparison shows the current gear and desired gear are identical; and commanding a change of state of the transmission to the desired gear from the current gear, if said comparison shows the current gear and desired gear are not identical.

3. The method of claim 1, wherein the step of determining the net torque delivered by the engine comprises:

determining engine load;

defining a third function relating engine load and engine speed to a corresponding engine mean brake torque;

determining engine mean brake torque from the third function;

determining the current magnitude of engine operating parameters affected by operation of the device and related to net torque delivered by the engine; and determining net engine torque from the current magnitude of said parameters, engine mean brake torque, and engine frictional loss.

4. The method of claim 3, wherein the step of determining the current magnitude of engine parameters comprises determining the current magnitude of the air-fuel ratio supplied to the engine, engine spark advance with respect to an optimal spark reference, and number of functioning engine fuel injectors.

5. In an automotive vehicle powertrain including an automatic transmission that operates in multiple gears in accordance with the engaged and disengaged state of friction elements, an engine controlled by a variable-position throttle, a device enabled part-time to alter the magnitude of power produced by the engine from that corresponding to the throttle position, and a computer accessible to an electronic memory, a method comprising the steps of:

storing in memory a first function relating a range of operating conditions of the powertrain defined by throttle position and vehicle speed to corresponding desired gears;

storing in memory a second function relating engine speed and net engine torque to corresponding synthetic throttle positions;

repetitively determining current net engine torque, current vehicle speed, current engine speed, and current throttle position;

accessing the memory with current engine speed and current net engine torque and determining from the second function the corresponding synthetic throttle position;

while the device is enabled, accessing memory with current vehicle speed and said corresponding synthetic throttle position and determining from the first function the current desired gear; and producing a signal from the computer commanding a change in the engaged and disengaged state of the friction elements to produce said desired gear, so determined.

6. The method of claim 5, wherein the step of controlling the transmission further comprises:

comparing the current gear to the desired gear;

producing a signal maintaining the current state of the friction elements, if said comparison shows the current gear and desired gear are identical; and producing a signal commanding a change of state of the friction elements from the state corresponding to the desired gear from the state corresponding to the current gear, if said comparison shows the current gear and desired gear are not identical.

7. The method of claim 5, wherein the step of determining the net torque delivered by the engine comprises:

determining current air flow rate into the engine and aircharge under standard conditions of pressure and temperature;

calculating current cylinder aircharge by dividing current air flow rate into the engine by current engine speed;

calculating engine load by dividing current cylinder aircharge by aircharge under standard conditions of pressure and temperature;

storing in the memory a third function relating engine load and engine speed to a corresponding engine mean brake torque;

accessing the memory with current engine speed and current engine load and determining from the third function the corresponding engine mean brake torque;

determining the current magnitude of engine operating parameters affected by operation of the device and related to net torque delivered by the engine; and calculating net engine torque from the current magnitude of said parameters, engine mean brake torque, and engine frictional loss.

8. The method of claim 7, wherein the step of determining the current magnitude of engine parameters comprises determining the current magnitude of the air-fuel ratio supplied to the engine, engine spark advance with respect to an optimal spark reference, and the number of engine fuel injectors.

9. A system for controlling an automatic transmission that operates in multiple gears, comprising:

an engine controlled by a variable-position throttle;

a traction assist device enabled part-time to alter the magnitude of power produced by the engine from that corresponding to the throttle position, receiving signals representing the speed of the vehicle wheels, determining the occurrence of wheel slippage therefrom, and producing a command signal to alter the magnitude of power produced by the engine from that corresponding to the throttle position;

sensors repetitively producing signals representing current vehicle speed, current engine speed, and current throttle position;

an electronic memory containing control algorithms, a first function relating a range of operating conditions of the powertrain defined by throttle position and vehicle speed to corresponding desired gears, and a second function relating engine speed and net engine torque to corresponding synthetic throttle positions; and an electronic microprocessor adapted to receive as input said sensor signals, process information derived from said signals, execute control algorithms, determine current net engine torque, and produce a command signal representing the desired gear produced by the transmission.

10. The system of claim 9, wherein the memory further contains a third function relating engine load and engine speed to a corresponding engine mean brake torque.

* * * * *